(12) United States Patent
Cai et al.

(10) Patent No.: US 9,755,521 B2
(45) Date of Patent: Sep. 5, 2017

(54) INTERLEAVED SWITCHING POWER SUPPLY AND CONTROL METHOD FOR THE SAME

(71) Applicant: Silergy Semiconductor Technology (Hangzhou) LTD, Hangzhou, ZheJiang Province (CN)

(72) Inventors: Yongbin Cai, Hangzhou (CN); Shengjun Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/960,726

(22) Filed: Dec. 7, 2015

(65) Prior Publication Data
US 2016/0172977 A1     Jun. 16, 2016

(30) Foreign Application Priority Data
Dec. 15, 2014 (CN) .......................... 2014 1 0775385

(51) Int. Cl.
*H02M 3/158* (2006.01)
*H02M 1/14* (2006.01)
*H02M 1/00* (2006.01)

(52) U.S. Cl.
CPC .......... *H02M 3/1584* (2013.01); *H02M 1/14* (2013.01); *H02M 2001/0025* (2013.01); *H02M 2003/1586* (2013.01)

(58) Field of Classification Search
CPC . H02M 2001/0009; H02M 2001/0025; H02M 1/14; H02M 3/156; H02M 3/1584; H02M 2003/1586
See application file for complete search history.

(56) References Cited

U.S. PATENT DOCUMENTS

| | | | |
|---|---|---|---|
| 7,023,182 B1 * | 4/2006 | Kleine | H02M 3/1584 323/212 |
| 8,098,505 B1 | 1/2012 | Choi | |
| 8,482,948 B2 | 7/2013 | Chen | |
| 9,130,456 B2 | 9/2015 | Yu et al. | |
| 2002/0125869 A1 * | 9/2002 | Groom | H02M 3/1584 323/283 |
| 2005/0001597 A1 * | 1/2005 | Walters | H02J 1/102 323/222 |
| 2009/0257257 A1 | 10/2009 | Adragna et al. | |

(Continued)

*Primary Examiner* — Fred E Finch, III
(74) *Attorney, Agent, or Firm* — Michael C. Stephens, Jr.

(57) ABSTRACT

A control circuit for an interleaved switching power supply having a plurality of parallel coupled power stage circuits, can include: a feedback circuit that receives an output voltage of the interleaved switching power supply, and generates an output voltage feedback signal; a ripple generator that receives a plurality of switching control signals, and generates an AC ripple signal having a frequency that is N times a switching frequency; an adder circuit that adds the output voltage feedback signal with the AC ripple signal, and generates a superposition signal; a comparison circuit that receives the superposition signal and a reference voltage, and generates a comparison signal; and a frequency divider circuit that divides the comparison signal into a plurality of turn on control signals configured to control turn on of a plurality of main power switches in the plurality of power stage circuits.

8 Claims, 8 Drawing Sheets

(56) References Cited

U.S. PATENT DOCUMENTS

| | | | |
|---|---|---|---|
| 2011/0234193 A1* | 9/2011 | Laur | H02M 3/1584 323/311 |
| 2013/0069611 A1* | 3/2013 | Menegoli | H02M 3/1584 323/284 |
| 2015/0028832 A1* | 1/2015 | Tournatory | H02M 3/1584 323/271 |
| 2015/0077073 A1 | 3/2015 | Yu et al. | |
| 2015/0091535 A1* | 4/2015 | Fan | H02M 3/1584 323/234 |
| 2015/0188430 A1 | 7/2015 | Yuan | |
| 2015/0194892 A1* | 7/2015 | Kudo | H02M 3/1588 323/271 |
| 2015/0323570 A1* | 11/2015 | Guthrie | H02M 3/1584 324/130 |

* cited by examiner

INTERLEAVED SWITCHING POWER SUPPLY AND CONTROL METHOD FOR THE SAME

RELATED APPLICATIONS

This application claims the benefit of Chinese Patent Application No. 201410775385.9, filed on Dec. 15, 2014, which is incorporated herein by reference in its entirety.

FIELD OF THE INVENTION

The present disclosure generally relates to the field of power electronics, and more particularly to interleaved switching power supplies, and associated control methods.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, a control circuit for an interleaved switching power supply having a plurality of parallel coupled power stage circuits, can include: (i) a feedback circuit configured to receive an output voltage of the interleaved switching power supply, and to generate an output voltage feedback signal; (ii) a ripple generator configured to receive a plurality of switching control signals, and to generate an AC ripple signal having a frequency that is N times a switching frequency, where N is equal to a number of the plurality of power stage circuits; (iii) a first adder circuit configured to add the output voltage feedback signal with the AC ripple signal, and to generate a superposition signal; (iv) a comparison circuit configured to receive the superposition signal and a reference voltage, and to generate a comparison signal; and (v) a frequency divider circuit configured to divide the comparison signal into a plurality of turn on control signals configured to control turn on of a plurality of main power switches in the plurality of power stage circuits, where at least two of the plurality of turn on control signals have a predetermined phase angle therebetween.

In one embodiment, a method of controlling an interleaved switching power supply having a plurality of parallel coupled power stage circuits, can include: (i) generating an output voltage feedback signal from an output voltage of the interleaved switching power supply; (ii) receiving a plurality of switching control signals, and generating an AC ripple signal having a frequency that is N times a switching frequency, where N is equal to a number of the plurality of power stage circuits; (iii) generating a superposition signal by adding the output voltage feedback signal with the AC ripple signal; (iv) generating a comparison signal from the superposition signal and a reference voltage; and (v) dividing the comparison signal into a plurality of turn on control signals for controlling turn on of a plurality of main power switches in the plurality of power stage circuits, where at least two of the plurality of turn on control signals have a predetermined phase angle therebetween.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
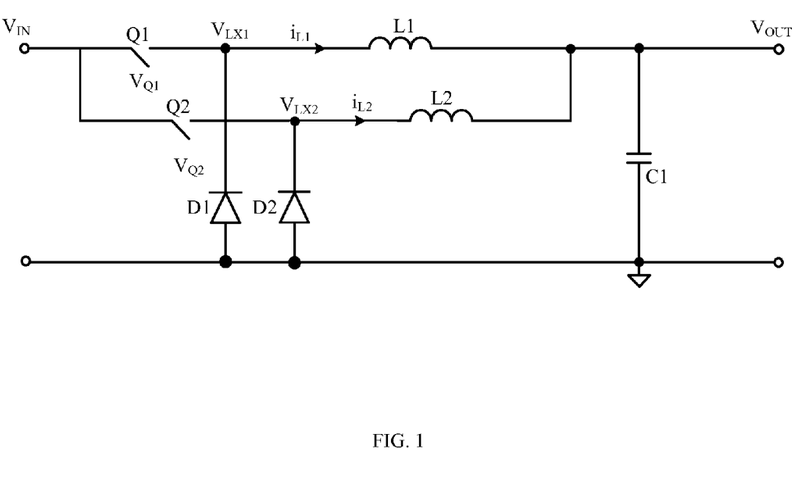
FIG. 1 is a schematic block diagram of an example interleaved switching power supply.

Referring now to FIG. 1, shown is a schematic block diagram of an example interleaved switching power supply. An interleaved topology can be utilized in the main circuit of the switching power supply in order to increase the power density, and to reduce the voltage ripple. In this example, main power switches Q1 and Q2 can be configured in an interleaved two-channel buck circuit, and may conduct with 180° phase angle between them. In this way, the ripples of inductor currents $i_{L1}$ and $i_{L2}$ can be substantially canceled out, and the frequency of an output current can be increased by a factor of about two, so the output current ripple may be significantly reduced, along with the output voltage ripple. Therefore, smaller output capacitors may be utilized in such an interleaved two-channel buck circuit, as compared with a signal-channel buck circuit. This is because each channel of the two-channel buck circuit may only be subjected to half of the total power, in order to improve the system efficiency. Generally, fixed frequency control can be utilised in such an interleaved switching power supply. For example, the two main power switches may be turned on according to two clock signals with a fixed phase difference. However, in this case the dynamic response may be relatively slow, and the compensation design may be relatively complicated.

In one embodiment, a control circuit for an interleaved switching power supply having a plurality of parallel coupled power stage circuits, can include: (i) a feedback circuit configured to receive an output voltage of the interleaved switching power supply, and to generate an output voltage feedback signal; (ii) a ripple generator configured to receive a plurality of switching control signals, and to generate an AC ripple signal having a frequency that is N times a switching frequency, where N is equal to a number of the plurality of power stage circuits; (iii) a first adder circuit configured to add the output voltage feedback signal with the AC ripple signal, and to generate a superposition signal; (iv) a comparison circuit configured to receive the superposition signal and a reference voltage, and to generate a comparison signal; and (v) a frequency divider circuit configured to divide the comparison signal into a plurality of turn on control signals configured to control turn on of a plurality of main power switches in the plurality of power stage circuits, where at least two of the plurality of turn on control signals have a predetermined phase angle therebetween.

Figure 2:
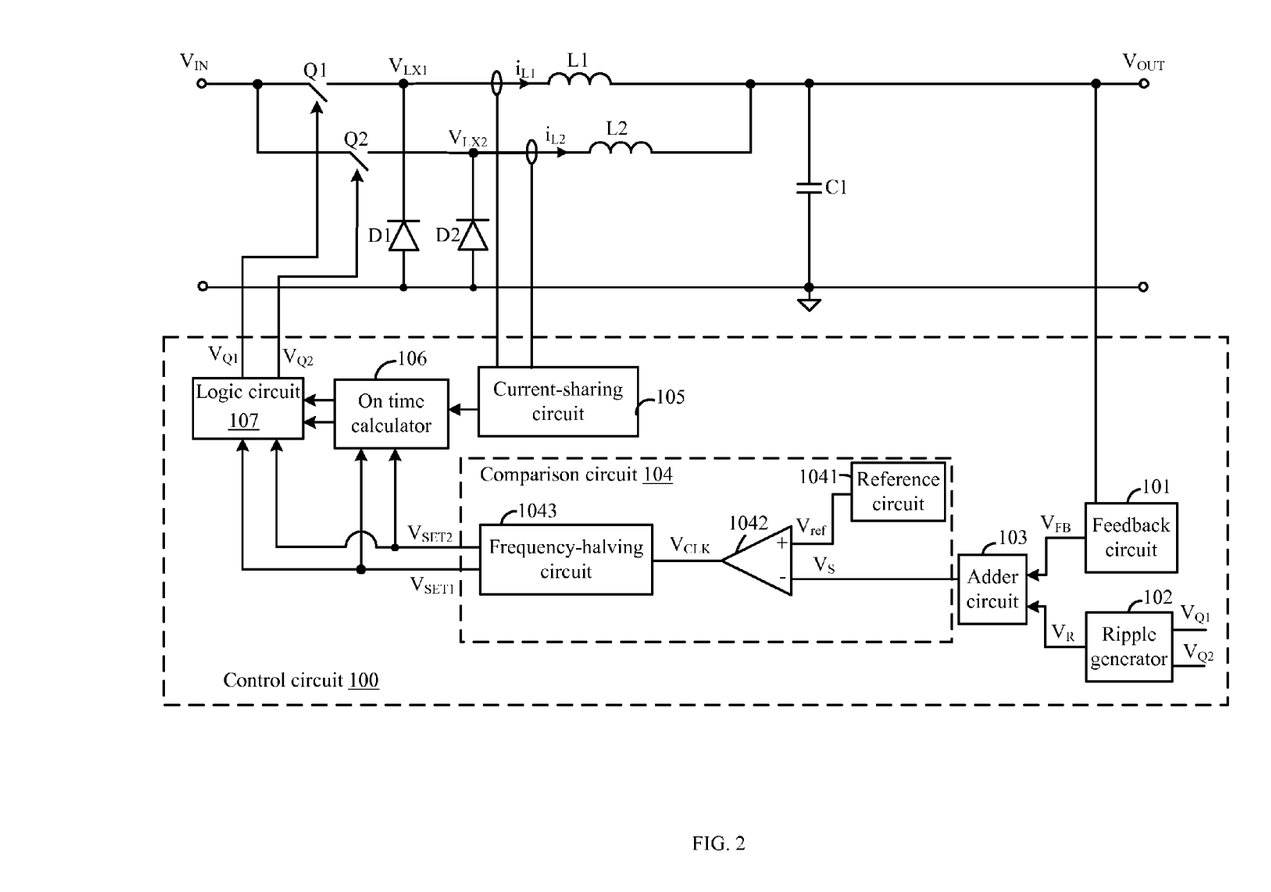
FIG. 2 is a schematic block diagram of an example interleaved switching power supply, in accordance with embodiments of the present invention.

Referring now to FIG. 2, shown is a schematic block diagram of an example interleaved switching power supply, in accordance with embodiments of the present invention. In this particular example, the interleaved switching power supply can include two parallel buck-type converters, and control circuit 100 that may generate switching control signals to control (e.g., turn on/off) the main power switches in the power stage circuits. Control circuit 100 can include feedback circuit 101, ripple generator 102, adder circuit 103, and comparison circuit 104. Feedback circuit 101 can receive the output voltage ($V_{OUT}$) of the switching power supply and generate output voltage feedback signal $V_{FB}$.

Ripple generator 102 can receive switching control signals $V_{Q1}$ and $V_{Q2}$ of the main power switches, and may generate AC ripple signal $V_R$. For example, the frequency of AC ripple signal $V_R$ can be N times the switching frequency, where N is the number of power stage circuits. Thus as there are two power stage circuits in this particular example, the frequency of AC ripple signal $V_R$ may be two times the switching frequency. Also, the switching frequency in different power stage circuits can be the same, or substantially the same. Adder circuit 103 (e.g., an analog adder) can be used to add output voltage feedback signal $V_{FB}$ and AC ripple signal $V_R$, and may generate superposition signal $V_S$.

Comparison circuit 104 can receive superposition signal $V_S$ and reference voltage $V_{ref}$. For example, comparison circuit 104 can include reference voltage 1041, comparator 1042, and frequency-halving circuit 1043. Reference circuit 1041 can generate reference voltage $V_{ref}$. Comparator 1042 may receive reference voltage $V_{ref}$ at a non-inverting input terminal, and superposition signal $V_S$ at an inverting input terminal, and may generate comparison signal $V_{CLK}$. Frequency-halving circuit 1043 can receive comparison signal $V_{CLK}$, and may generate turn on control signals $V_{SET1}$ and $V_{SET2}$ with a predetermined phase difference (e.g., 180°) by dividing the frequency. These turn on control signals can be used to respectively turn on main power switches Q1 and Q2 in the power stage circuits, so as to achieve interleaved control.

Control circuit 100 can also include current-sharing circuit 105, on time calculator 106, and logic circuit 107. Current-sharing circuit 105 can generate a current-sharing signal by sampling the inductor currents. For example, current-sharing circuit 105 can compare the average values of the two inductor currents, and may increase or decrease the on time of main power switch Q2 when the average values are not equal to each other. In this way, the two inductor currents can be equalized after repeatedly regulating the on time of main power switch Q2.

On time calculator 106 can receive the current-sharing signal and the turn on control signals, and may generate turn off control signals in order to turn off the main power switches. For example, on time calculator 106 may begin timing at trigger edges of turn on control signals $V_{SET1}$ and $V_{SET2}$, and may generate turn off control signals when timing value reaches a predetermined value, or can regulate the on time of one main power switch according to turning signals $V_{SET1}$ and $V_{SET2}$ and the current-sharing signal, in order to generate a turn off control signal after a predetermined value. Logic circuit 107 can receive the turn on and turn off control signals, and may generate switching control signals $V_{Q1}$ and $V_{Q2}$, in order to control the main power switches. Logic circuit 107 can be implemented by any suitable circuit structure, such as an RS flip-flop.

Figure 3:
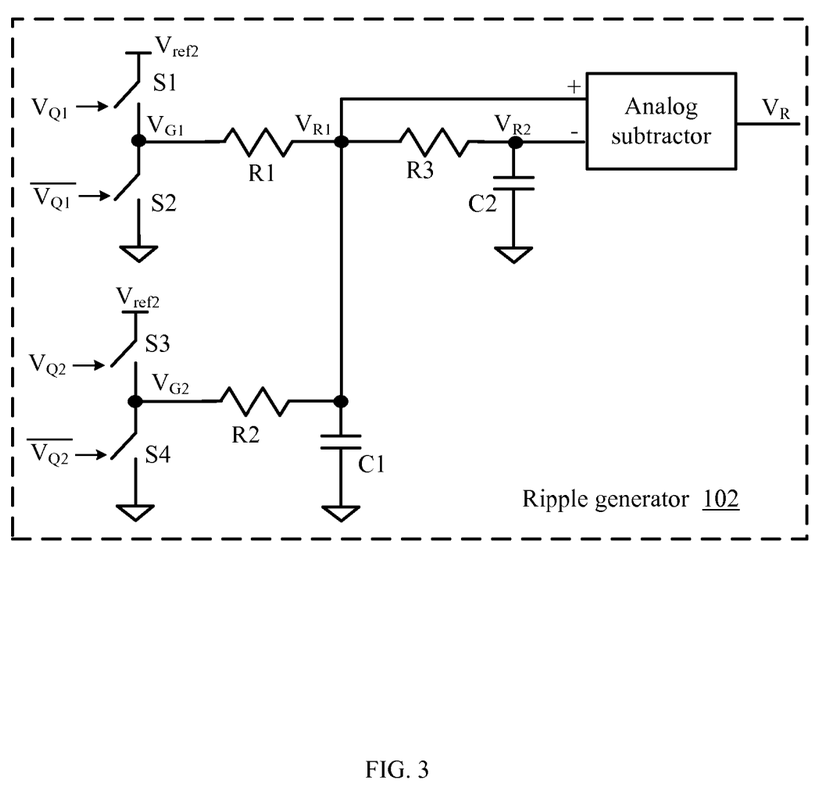
FIG. 3 is a schematic block diagram of an example ripple generating circuit, in accordance with embodiments of the present invention.

Referring now to FIG. 3, shown is a schematic block diagram of an example ripple generating circuit, in accordance with embodiments of the present invention. In this particular example, AC ripple signal $V_R$ can be generated according to switching control signals $V_{Q1}$ and $V_{Q2}$, so as to accurately control the main power switches with a phase difference. Ripple generator 102 can include a multi-channel chopping circuit, first and second filter circuits, and a subtracting circuit. The multi-channel chopping circuit corresponding to the power stage circuits can include two chopping circuits, where the first chopping circuit includes switches S1 and S2 and may have an input terminal coupled to voltage source $V_{ref2}$. Switch S1 can be controlled by switching control signal $V_{Q1}$ corresponding to main power switch Q1, and switch S2 can be controlled by an inverted version of switching control signal $V_{Q1}$.

The second chopping circuit can include switches S3 and S4 may have an input terminal coupled to voltage source $V_{ref2}$. Switch S3 can be controlled by switching control signal $V_{Q2}$ corresponding to main power switch Q2, and switch S4 can be controlled by an inverted version of switching control signal $V_{Q2}$. Chopped signal $V_{G1}$ with a same phase as voltage $V_{LX1}$ at a node LX1 of the power stage circuit can be generated from voltage source $V_{ref2}$ via the first chopping circuit. Similarly, chopped signal $V_{G2}$ with the same as a voltage $V_{LX2}$ at node LX2 of the power stage circuit can be generated from voltage source $V_{ref2}$ via the second chopping circuit.

Chopped signals $V_{G1}$ and $V_{G2}$ can be processed by the first filter circuit to generate filtered signal $V_{R1}$ having a same phase as the inductor current. The first filter circuit can include resistors R1 and R2, and capacitor C1. Resistor R1 may have a first terminal coupled to an output terminal of the first chopping circuit to receive chopped signal $V_{G1}$. Resistor R2 may have a first terminal coupled to an output terminal of the second chopping circuit to receive chopped signal $V_{G2}$. The second terminals of resistors R1 and R2 can both connect to a first terminal of capacitor C1, and a voltage at the first terminal of the first capacitor may be configured as filtered signal $V_{R1}$. For example, filtered signal $V_{R1}$ can be a triangular wave signal having a same phase as the inductor current.

Also, filtered signal $V_{R2}$ can be obtained by smoothing filtered signal $V_{R1}$ via the second filter circuit. The second filter circuit can include resistor R3 and capacitor C2. Resistor R3 may have a first terminal that can receive filtered signal $V_{R1}$, and a second terminal connected to a first terminal of capacitor C2. A second terminal of capacitor C2 can be grounded, and a voltage at the first terminal of capacitor C2 can be configured as filtered signal $V_{R2}$. The subtracting circuit (e.g., an analog subtractor) can receive filtered signals $V_{R1}$ and $V_{R2}$, and may generate AC ripple signal $V_R$.

Figure 4:
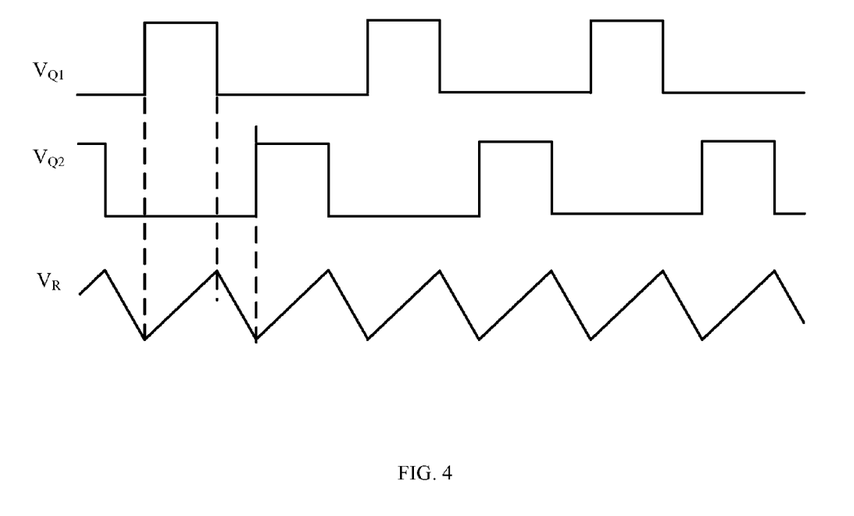
FIG. 4 is a waveform diagram of example operation of the ripple generating circuit of FIG. 3, in accordance with embodiments of the present invention.
Figure 5:
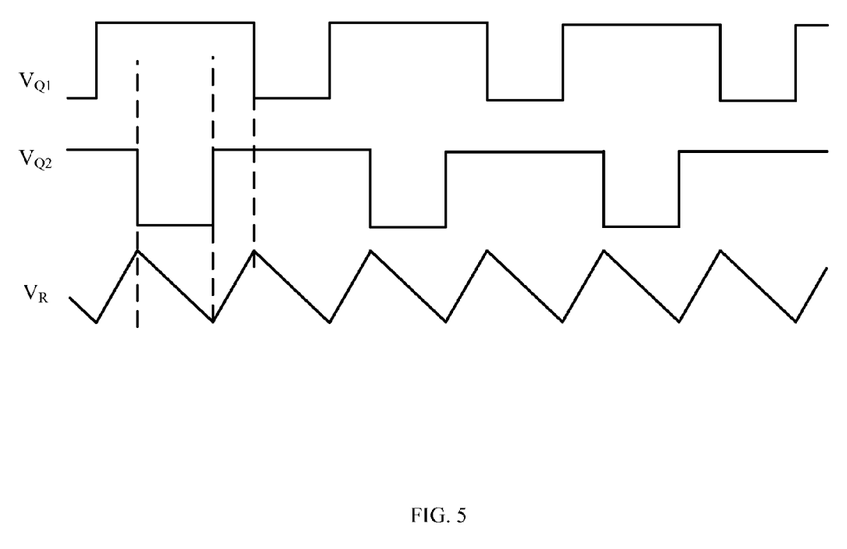
FIG. 5 is a waveform diagram of another example operation of the ripple generating circuit of FIG. 3, in accordance with embodiments of the present invention.

Referring now to FIGS. 4 and 5, shown are waveform diagrams of example operation of the ripple generating circuit of FIG. 3, in accordance with embodiments of the present invention. The AC ripple signals may have different amplitude in the cases of different duty cycles. The waveforms of FIG. 4 show operation of the ripple generator when the duty cycle is less than 0.5, with the waveform of AC ripple signal $V_R$ shown. In FIG. 5, operation of the ripple generator is shown when the duty cycle is greater than 0.5. When the duty cycle is relatively close to 0.5, the AC ripple signal can be relatively small, and the system may not be stable in some cases. Thus, a ramp compensation signal can be added in such cases in order to provide a fixed voltage to obtain reference voltage $V_{ref}$, and to substantially guarantee the stability of the system.

Figure 6:
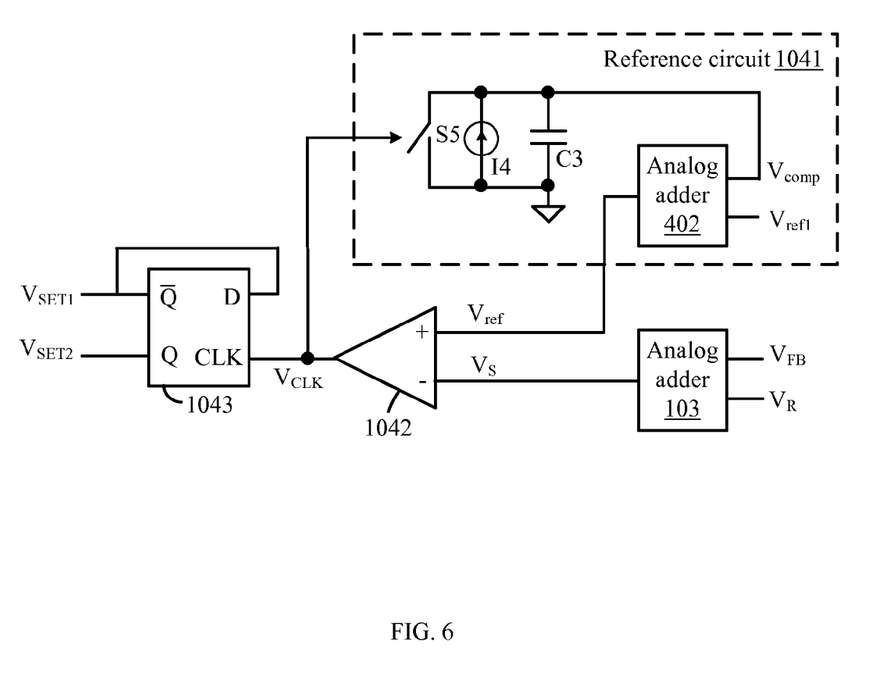
FIG. 6 is schematic block diagram of an example reference circuit, in accordance with embodiments of the present invention.

Referring now to FIG. 6, shown is schematic block diagram of an example reference circuit, in accordance with embodiments of the present invention. In this example, the reference circuit can include a ramp compensation circuit, a constant voltage source, and an adder circuit (e.g., an analog adder). The ramp compensation circuit can include switch S5, current source 14, and compensation capacitor C3 coupled in parallel. The control terminal of switch S5 can receive comparison signal $V_{CLK}$ (generated by comparison circuit 1042. Compensation capacitor C3 can be charged by current source 14 by turning off switch S5, and may be discharged by turning on switch S5, so as to generate ramp compensation signal $V_{comp}$ at one terminal of compensation capacitor C3. Also, adder circuit 402 can receive ramp compensation signal $V_{comp}$ and a fixed voltage $V_{ref1}$ generated by a constant voltage source, and may generate reference voltage $V_{ref}$. For example, the frequency of ramp compensation signal $V_{comp}$ can be twice the switching frequency, and may be implemented by a D-type flip-flop as frequency-halving circuit 1043.

Figure 7:
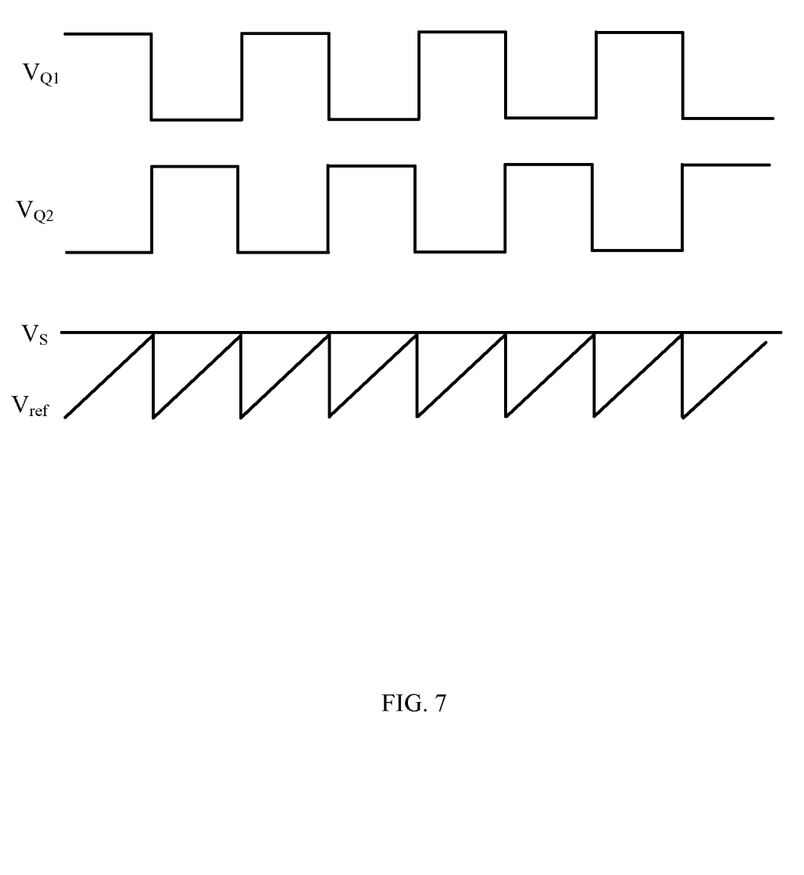
FIG. 7 is a waveform diagram of example operation of the reference circuit of FIG. 6, in accordance with embodiments of the present invention.

Referring now to FIG. 7, shown is a waveform diagram of example operation of the reference circuit of FIG. 6, in accordance with embodiments of the present invention. This example waveform diagram shows operation of the D-type flip-flop in FIG. 6 when both the duty cycles of main transistor switches Q1 and Q2 are 0.5. AC ripple signal $V_R$ can be substantially in form of a straight line, so superposition signal $V_S$ may be substantially a straight line. Reference voltage $V_{ref}$ may be a sawtooth signal due to ramp compensation signal $V_{comp}$. Comparison signal $V_{CLK}$ can be obtained by comparing reference voltage $V_{ref}$ against superposition signal $V_S$ via comparison circuit 1042, and turn on control signals $V_{SET1}$ and $V_{SET2}$ can then be generated via frequency-halving circuit 1043.

In one embodiment, a method of controlling an interleaved switching power supply having a plurality of parallel coupled power stage circuits, can include: (i) generating an output voltage feedback signal from an output voltage of the interleaved switching power supply; (ii) receiving a plurality of switching control signals, and generating an AC ripple signal having a frequency that is N times a switching frequency, where N is equal to a number of the plurality of power stage circuits; (iii) generating a superposition signal by adding the output voltage feedback signal with the AC ripple signal; (iv) generating a comparison signal from the superposition signal and a reference voltage; and (v) dividing the comparison signal into a plurality of turn on control signals for controlling turn on of a plurality of main power switches in the plurality of power stage circuits, where at least two of the plurality of turn on control signals have a predetermined phase angle therebetween.

Figure 8:
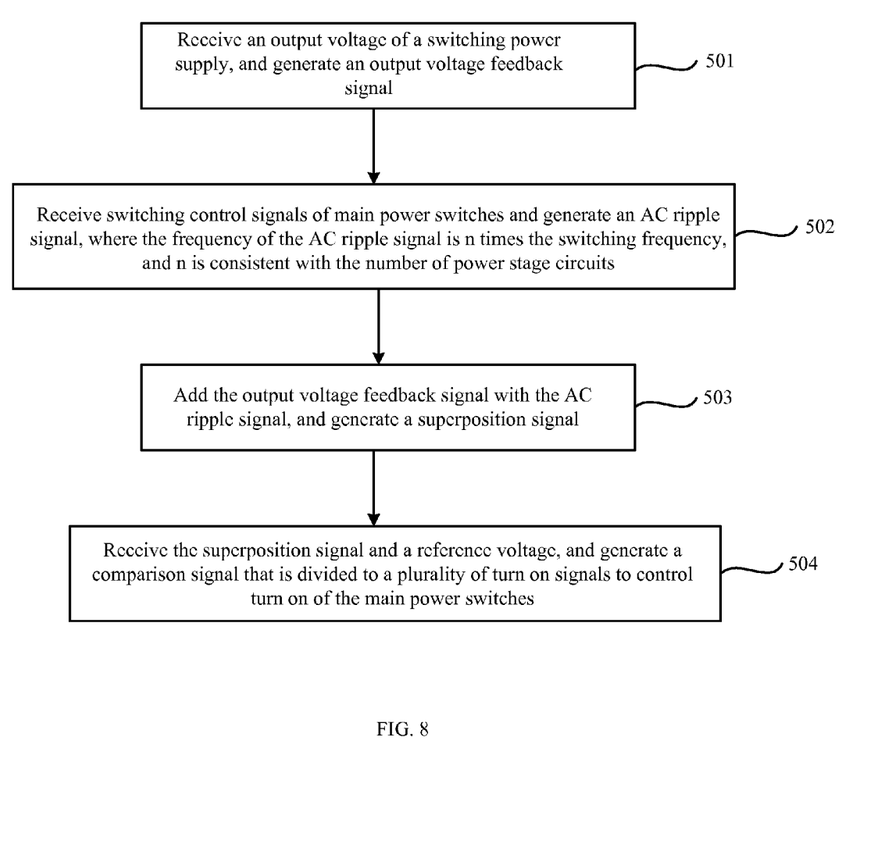
FIG. 8 is a flow diagram of an example method of controlling an interleaved switching power supply, in accordance with embodiments of the present invention.

Referring now to FIG. 8, shown is a flow diagram of an example method of controlling an interleaved switching power supply, in accordance with embodiments of the present invention. The interleaved switching power supply can include a plurality of parallel coupled power stage circuits. The main power switches in the plurality of power stage circuits can be controlled as follows. At S501, an output voltage (e.g., $V_{OUT}$) of the switching power supply can be received, and an output voltage feedback signal (e.g., $V_{FB}$) can be generated (e.g., by feedback circuit 101).

At S502, switching control signals (e.g., $V_{Q1}$, $V_{Q2}$) of main power switches (e.g., Q1, Q2) can be received and an AC ripple signal (e.g., $V_R$) can be generated (e.g., by ripple generator 102). For example, the frequency of the AC ripple signal can be N times the switching frequency, where N is the number of power stage circuits. At S503, the output voltage feedback signal can be added (e.g., by adder circuit 103) with the AC ripple signal, and a superposition signal (e.g., $V_S$) can be generated. At S504, the superposition signal and a reference voltage (e.g., $V_{ref}$) can be received, and a comparison signal (e.g., $V_{CLK}$) can be generated (e.g., by comparator 1042). The comparison signal can then be divided (e.g., by frequency-halving circuit 1043) to generate turn on control signals (e.g., $V_{SET1}$, $V_{SET2}$) to control turn on of the main power switches. Also, there may be a predetermined phase angle between the turn on control signals.

In addition, the inductor currents (e.g., $I_{L1}$, $I_{L2}$) in the power stage circuits can be sampled, and a current-sharing signal can be generated (e.g., by current-sharing circuit 105). The current-sharing signal and the turn on control signals can be received, and turn off control signals can be generated (e.g., by on time calculator 106) to turn off main power switches. In addition, the turn on and turn off control signals can be received, and switching control signals can be generated (e.g., by logic circuit 107), in order to control the main power switches.

The AC ripple signal may be generated (see, e.g., FIG. 3) by chopping a voltage source according to a switching control signal in one channel, and generating a corresponding chopped signal. The chopped signals can be filtered to generate a first filtered signal (e.g., $V_{R1}$) having a same phase as the inductor current in a power stage circuit. A second filtered signal (e.g., $V_{R2}$) can be generated by smoothing the first filtered signal. The AC ripple signal can be generated (e.g., by an analog subtractor) from the first and second filtered signals.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for an interleaved switching power supply having a plurality of parallel coupled power stage circuits, the control circuit comprising:

a) a feedback circuit configured to receive an output voltage of said interleaved switching power supply, and to generate an output voltage feedback signal;
b) a ripple generator configured to receive a plurality of switching control signals, and to generate an AC ripple signal having a frequency that is N times a switching frequency, wherein N is equal to a number of said plurality of power stage circuits;
c) a first adder circuit configured to add said output voltage feedback signal with said AC ripple signal, and to generate a superposition signal;
d) a comparison circuit configured to receive said superposition signal and a reference voltage, and to generate a comparison signal;
e) a frequency divider circuit configured to divide said comparison signal into a plurality of turn on control signals configured to control turn on of a plurality of main power switches in said plurality of power stage circuits, wherein at least two of said plurality of turn on control signals have a predetermined phase angle therebetween;
f) a current-sharing circuit configured to sample inductor currents in said plurality of power stage circuits, and to generate a current-sharing signal;
g) an on time calculator configured to receive said current-sharing signal and said plurality of turn on control signals, and to generate a plurality of turn off control signals configured to control turn off of said plurality of main power switches; and
h) a logic circuit configured to receive said plurality of turn on and turn off control signals, and to generate said plurality of switching control signals configured to control said plurality of main power switches.

2. The control circuit of claim 1, wherein said ripple generator comprises:
a) a plurality of chopping circuits corresponding to said plurality of power stage circuits, and being configured to generate a plurality of chopped signals, wherein each chopping circuit is configured to chop a voltage source according to a corresponding of said plurality of switching control signals, and to generate a corresponding chopped signal;
b) a first filter circuit configured to filter said plurality of chopped signals, and to generate a first filtered signal having a phase that matches said inductor current in a corresponding of said plurality of power stage circuits;
c) a second filter circuit configured to generate a second filtered signal by smoothing said first filtered signal; and
d) a subtracting circuit configured to receive said first and second filtered signals, and to generate said AC ripple signal.

3. The control circuit of claim 2, wherein said first filter circuit comprises a plurality of resistors, wherein each of said plurality of resistors has a first terminal coupled to an output terminal of said plurality of chopping circuits, and a second terminal coupled to a first terminal of a first capacitor, wherein a second terminal of said first capacitor is grounded, and wherein a voltage at said first terminal of said first capacitor is configured as said first filtered signal.

4. The control circuit of claim 2, wherein said second filter circuit comprises a filter resistor having a first terminal that receives said first filtered signal, and a second terminal coupled to a first terminal of a second capacitor, wherein said second terminal of said second capacitor is grounded, and wherein a voltage at said first terminal of said second capacitor is configured as said second filter signal.

5. The control circuit of claim 1, wherein said reference voltage comprises a fixed voltage signal generated by a reference circuit having a constant voltage source.

6. The control circuit of claim 1, further comprising a reference circuit configured to generate said reference voltage, wherein said reference circuit comprises:
a) a ramp compensation circuit having a switch, a current source, and a compensation capacitor coupled in parallel, wherein said switch is controllable by said comparison signal to control charge and discharge of said compensation capacitor, and to generate a ramp compensation signal at one terminal of said compensation capacitor; and
b) a second adder circuit configured to receive said ramp compensation signal and a constant voltage generated by a constant voltage source, and to generate said reference voltage.

7. A method of controlling an interleaved switching power supply having a plurality of parallel coupled power stage circuits, the method comprising:
a) generating an output voltage feedback signal from an output voltage of said interleaved switching power supply;
b) receiving a plurality of switching control signals, and generating an AC ripple signal having a frequency that is N times a switching frequency, wherein N is equal to a number of said plurality of power stage circuits;
c) generating a superposition signal by adding said output voltage feedback signal with said AC ripple signal;
d) generating a comparison signal from said superposition signal and a reference voltage;
e) dividing said comparison signal into a plurality of turn on control signals for controlling turn on of a plurality of main power switches in said plurality of power stage circuits, wherein at least two of said plurality of turn on control signals have a predetermined phase angle therebetween;
f) generating a current-sharing signal from sampling inductor currents in said plurality of power stage circuits;
g) generating a plurality of turn off control signals for controlling turn off of said plurality of main power switches in response to said current-sharing signal and said plurality of turn on control signals; and
h) generating said plurality of switching control signals for controlling said plurality of main power switches in response to said plurality of turn on and turn off control signals.

8. A method of controlling an interleaved switching power supply having a plurality of parallel coupled power stage circuits, the method comprising:
a) generating an output voltage feedback signal from an output voltage of said interleaved switching power supply;
b) receiving a plurality of switching control signals, and generating an AC ripple signal having a frequency that is N times a switching frequency, wherein N is equal to a number of said plurality of power stage circuits;
c) generating a superposition signal by adding said output voltage feedback signal with said AC ripple signal;
d) generating a comparison signal from said superposition signal and a reference voltage;
e) dividing said comparison signal into a plurality of turn on control signals for controlling turn on of a plurality of main power switches in said plurality of power stage circuits, wherein at least two of said plurality of turn on control signals have a predetermined phase angle therebetween;

f) generating a plurality of chopped signals by chopping a voltage source according to a corresponding of said plurality of switching control signals;

g) generating, by filtering said plurality of chopped signals, a first filtered signal having a phase that matches said inductor current in a corresponding of said plurality of power stage circuits;

h) generating a second filtered signal by smoothing said first filtered signal; and i) generating said AC ripple signal from said first and second filtered signals.

* * * * *